Feb. 23, 1932.  W. BÄSELER  1,846,830
CAR RETARDING APPARATUS
Filed Aug. 30, 1930   2 Sheets-Sheet 1
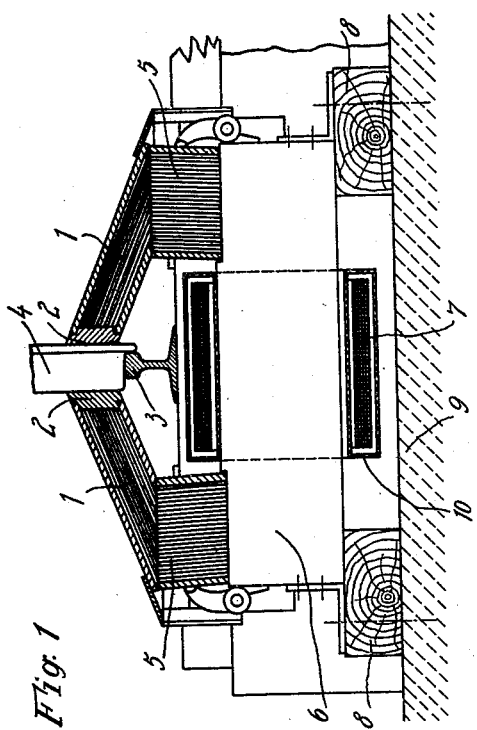
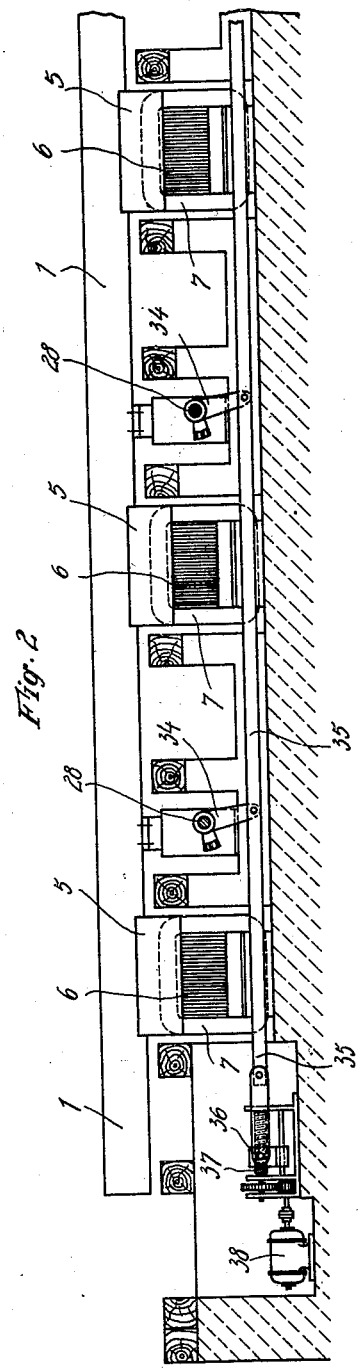
Inventor:
W. Bäseler,
by A. R. Vencill.
His Attorney.

Patented Feb. 23, 1932

1,846,830

UNITED STATES PATENT OFFICE

WOLFGANG BÄSELER, OF MUNICH, GERMANY

CAR RETARDING APPARATUS

Application filed August 30, 1930. Serial No. 479,023.

This invention relates to car retarding apparatus of the kind adapted to be located adjacent to the track rails of a track over which the vehicle to be retarded travels and comprising brake bars or their equivalent adapted to be automatically brought into engagement with the wheels or other portions of the vehicle by electro-magnetic action, so that retardation of the vehicle is thus not only effected by frictional action but also due to the eddy currents generated by the movement of the wheels or other portions of the vehicle relative to the magnetic flux traversing the brake bars.

In apparatus of this character it is evidently of advantage to arrange the brake bars in such a manner that, when in operative engagement with the wheels of the vehicle for the purpose of effecting retardation, the brake bars will engage with the wheels at a point as high as possible above the rim or flange of the wheel so as to increase the braking action. This desirable location of the brake bars is however limited by the necessity for avoiding the fouling of the axle boxes, brake rigging or other parts of the vehicle by the brake bars and it is generally only possible to permit the brake bars to project upwards beyond the heads of the track rails to a small extent. In the case of a locomotive the permissible projection of the brake bars above the track rails is considerably less to avoid fouling and since it is generally necessary in shunting operations in hump yards to permit the passage of trains including a locomotive over the retarding apparatus arrangments must be provided for lowering the upwardly projecting portions of retarding apparatus from their normal positions when required.

The present invention has for its principal object to provide improved lowering mechanism for this purpose a further object being to provide arrangements for operating the lowering mechanism as will be hereinafter described.

Figure 3:
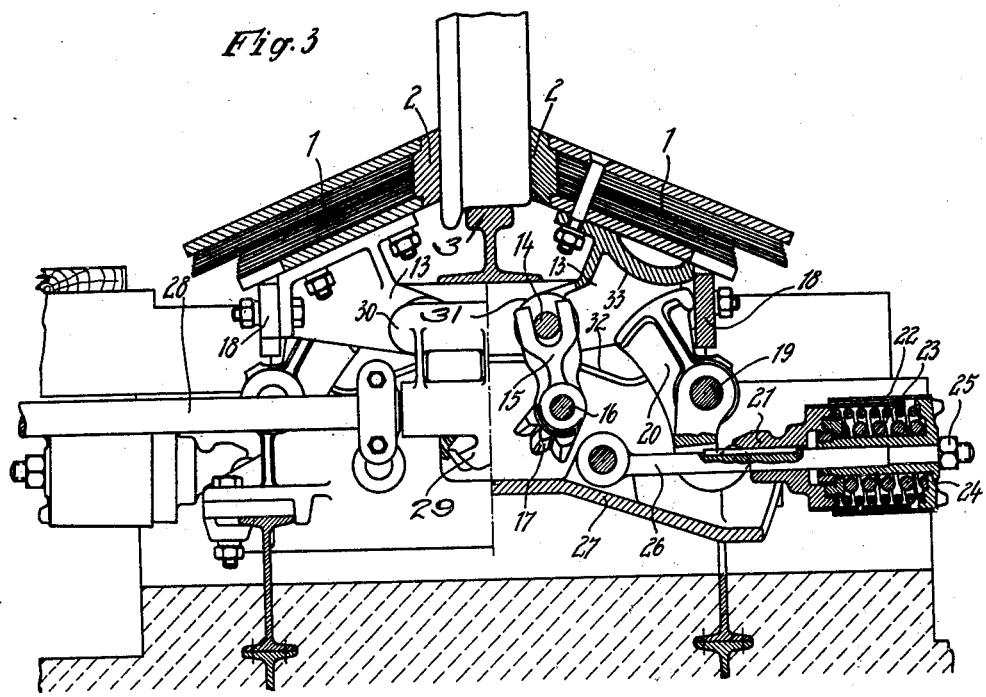
Figure 4:
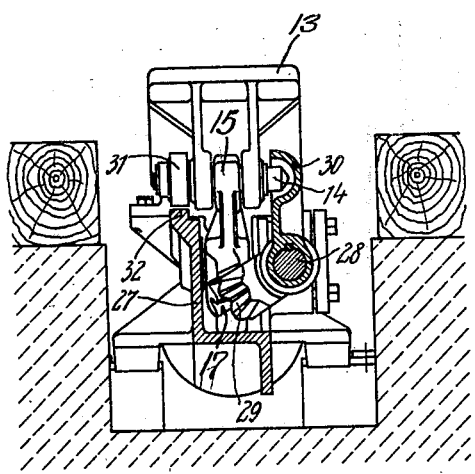

The invention is illustrated by way of example in the accompanying drawings of which Figure 1 is a transverse sectional view of car retarding apparatus embodying one form of the invention, Figure 2 being a view thereof in side elevation with certain parts of the mechanism omitted for the sake of clearness. Figure 3 is a transverse sectional view of the apparatus showing the lowering mechanism, Figure 4 is a view, partly in side elevation, and partly in section, showing a portion of the lowering mechanism.

Referring now to the drawings it will be seen that the apparatus comprises longitudinally arranged laminated brake bars 1 provided with brake shoe members 2, the brake bars 1 being arranged on each side of a track rail 3 so as to enable the brake shoe members 2 to engage with opposite sides of a car wheel 4. Located beneath each of the brake bars 1 and in magnetic engagement therewith are a plurality of substantially vertical core members 5 each consisting of a plurality of relatively thin plates of magnetizable material arranged side by side with one another.

The upper ends of each core member 5 are in magnetic engagement with the brake bar 1 and the lower ends of each core member 5 are in magnetic engagement with a corresponding laminated yoke 6.

In the particular embodiment of the invention described the apparatus comprises five yokes (of which three only are shown in Figure 2) each of these yokes being in magnetic engagement as shown in Figure 1 with a core member 5 arranged on each side of the track rail 3.

Each of the yokes 6 is provided with an energizing coil 7 surrounding the yoke, the latter being mounted as shown in Figure 1 upon horizontal wooden supports 8 interposed between the yoke 6 and the foundation 9 on which the apparatus is supported. The energizing coil 7 is protected against dust and moisture by being enclosed in a sheet metal casing 10 filled with suitable insulating material, the seams of the casing 10 being subsequently welded or soldered.

In operation it will be understood that the flux generated by the energizing coil 7 transverses the yoke 6, the core members 5, brake bars 1, brake shoes 2 and the wheel 4 of the car and owing to the tractive force exerted between the several elements of the magnetic circuit of the flux above refered to, it is unnecessary to provide any mechanical coupling between the brake bars 1 and the core members 5, the brake bars 1 simply resting upon the upper ends of the core members 5 so that these brake bars can be readily removed for the purpose of repair or replacement.

Referring now more particularly to Figures 3 and 4, which illustrate the mechanism for effecting the lowering of the brake bars 1 in order to permit the passage of a locomotive as above explained, it will be seen that each of the brake bars 1 is provided at spaced intervals intermediate the cores 6 with a plurality of brackets 13 arranged underneath the brake bar 1 and secured thereto by bolts as illustrated or in any other suitable manner. Each of the brackets 13 is provided with a transverse bolt 14 mounted in suitable lugs formed on the bracket 13 as shown in Figure 4, the portion of the bolt 14 between these lugs being adapted to be engaged by the forked end of an arm 15 mounted upon a pivot 16, the lower end of the arm 15 being provided with a toothed segment 17.

The outer face of the bracket 13 is provided with a transverse bar 18, the inner face of which is adapted to be engaged by the upper arm of a two-armed lever 20, rotatably supported upon a suitable pivot 19. The lower arm of the lever 20 is adapted to engage with the outer end of a collar 21 slidably mounted upon a rod 26, the right hand end of which is provided with a flanged bushing 24 secured thereto by means of a nut 25. Interposed between the flange on the bushing 24 and the collar 21 is a pair of compression springs 22, 23, adapted to oppose the movement of the collar 21 towards the right along the rod 26. The opposite end of the rod 26 to that carrying the nut 25 is pivotally mounted in a stationary frame 27 in which frame the pivots 16 and 19 are also mounted. The frame 27 encloses the lower part of the lowering mechanism and is mounted upon the foundation 9 of the apparatus in any suitable manner. A transverse shaft 28 is rotatably mounted in suitable bearings secured to the frame 27 and carries at its inner end a toothed segment 29 adapted to intermesh with the toothed segment 17 of the lowering mechanism of each brake bar 1.

The shaft 28 also carries rigidly secured thereto a recessed retaining member 30 adapted when the shaft 28 is in the angular position shown in Figure 4 to register with the projecting ends of the bolts 14 mounted in the brackets 13 and thereby limit the outward movement of the brackets 13 away from one another.

The opposite ends of the bolts 14 to those adjacent to the retaining member 30 are each provided with a roller 31 adapted to move along a track or guide projection 32 formed on the frame 27 thereby guiding the raising and lowering movements of the brackets 13 and of the brake bars 1 secured thereto.

On the lower side of each of the brackets 13 a curved projection 33 is provided adapted to support the bracket 13 and the brake bar 1 carried thereby in their lower positions by the engagement of the projection 33 with the upper arm of the lever 20 as will be hereinafter explained.

The outer end of each of the shafts 28 is provided with an operating arm 34 rigidly secured thereto, the arm 34 being pivotally connected to a driving rod 35 extending longitudinally as clearly shown in Figure 2. The driving rod 35 extends for the full length of the retarding apparatus and is connected at intervals to the several operating arms 34.

The extreme end of the rod 35 is suitably coupled to a nut member 36 adapted to be moved in one direction or another by the rotation of an externally screw-threaded spindle 37 cooperating with a correspondingly internally screw-threaded aperture in the nut member 36. The spindle 37 is adapted to be rotated through suitable gearing as indicated in Figure 2 by means of an electric motor 38 provided with suitable means of control (not shown) so as to cause the motor 38 to be rotated in one or the other direction as may be desired. It will be appreciated that the motor 38 through the mechanism above described is adapted to effect the movement of the driving rod 35 towards the right or left in accordance with the direction of rotation of the motor 38 and in cases in which the car retarding apparatus comprises braking mechanism for both track rails the motor 38 may be arranged to operate similarly the driving rod 35 for the other track rail.

The operation of the apparatus is as follows:

The various parts of the mechanisms being in their operative positions as shown, it will be evident that, when the energizing coil 7 is supplied with operating current, the brake bars 1 are attracted towards one another so as to bring the brake shoes 2 into contact with the sides of the car wheel 4 as shown in Figures 1 and 3, this inward movement of the brake bars 1 being opposed however by the engagement of the bars 18 with the upper arms of the pivoted levers 20. It will be evident that the inward movement of the bars 18 tends to cause the levers 20 to be rotated about their pivots 19 in such directions as to cause the lower arms of the levers 20 to move the collars 21 along the rods 26 thereby compressing the springs 22, 23, the further inward movement of the bars 18 being prevented as soon as the springs 22, 23 are fully compressed.

As soon as the supply of energizing current to the coil 7 is interrupted to cause the braking action to cease, the brake bars 1 are moved apart from one another under the action of the springs 22, 23, which in these circumstances move the collars 21 inwards along the rods 26 thereby causing the levers 20 to be rotated about the pivots 19 in such directions as to withdraw the brake shoes 2 from engaging with the sides of the car wheel 4, this withdrawal of the brake shoes 2 being assisted by the weight of the brake shoes 2 and of the brake bars 1.

So long as the shaft 28 and the retaining member 30 carried thereby occupy the position shown in Figure 4, the outward movement of the brackets 13 to withdraw the brake shoes 2 from the car wheel 4 is limited by the engagement of the bolts 14 with the ends of the recessed portion of the member 30 and in this position the brake shoes 2 are arranged to be withdrawn to such an extent as to permit the wheels of the cars to run through the retarding apparatus without any braking action being exerted.

If now it is desired to effect the lowering of the brake bars 1 and the brake shoes 2 in order to permit a locomotive to run through the retarding apparatus, operating current is supplied to the electric motor 38 so as to cause its rotation in such a direction as to move the driving rod 35 shown in Figure 2 towards the left. As a result the arms 34 of each lowering mechanism are angularly displaced so as to rotate each of the corresponding shafts 28 and thereby move the corresponding retaining member 30 away from the bolts 14 and these bolts being thus freed as regards outward movement the brackets 13 carrying the brake bars 1 are moved outwards under the action of their own weight and under the action of the springs 22, 23. This outward movement of the brackets 13 is accompanied by a corresponding outward movement of the arms 15 with the result that the segments 17 are caused to intermesh with the toothed segment 29 carried by the shaft 28 and the continued rotation of the shaft 28 will accordingly cause the arms 15 to be positively moved still further outwards away from one another carrying with them the brackets 13. During this outward movement the inner ends of the brackets 13 are supported by the rollers 31 engaging with the track projections 32, the brackets 13 being also supported by reason of the guide projections 33 resting upon the upper arm of the levers 20.

It will now be apparent that during the outward movement of the brackets 13 above described the inner ends of these brackets are lowered by the engagement of the rollers 31 with the track projections 32 so that the brake bars 1 are displaced from their upwardly inclined positions shown in Figures 1 and 3 to positions in which the brake bars 1 are substantially horizontal and are approximately at or slightly above the level of the head of the track rail 4, thereby permitting the passage of a locomotive through the retarding apparatus without any danger of the brake bars or brake shoes fouling any portion of the locomotive.

In order to restore the brake bars to their normal operative position, energizing current is supplied to the motor 38 so as to cause the rotation of the motor to move the driving rods 35 towards the right. Each of the shafts 28 is thus rotated in an anti-clockwise direction as viewed in Figures 2 and 4 with the result that by means of the toothed segment 29 co-operating with the toothed segments 17 the arms 15 are rotated in such directions as to effect the raising of the bolts 14 and consequently of the inner ends of the brackets 13 and of the brake bars 1.

The latter part of the movement of the driving rods 35 causes the toothed segment 29 to be disengaged from the toothed segment 17 so that the brake bars are freed to effect the braking action when required as soon as the coil 7 is again energized.

Furthermore the latter final part of the movement of the driving rods 35 causes each of the shafts 28 to bring the corresponding retaining member 30 again into registration with the bolts 14, thereby restoring all parts of the mechanism to their original positions as illustrated.

Although only one form of the invention has been described by way of example it is to be understood that various modifications may be made within the scope of the appended claims without exceeding the ambit of the invention.

Having now described my invention, what I claim as new and desire to secure by Letters Patent, is:—

1. In car retarding apparatus the combination of a pair of brake bars, a plurality of yoke members distributed at intervals along the length of said brake bars, means for magnetically connecting each of said yoke members to both of said brake bars, supporting members secured at intervals along the length of each of said brake bars, a stationary frame adjacent to each of said members, a movable member mounted in said frame and engaging with said supporting member, remotely controlled means for actuating said movable member, and means independent of said remotely controlled means for effecting the movement of said movable member.

2. In car retarding apparatus the combination of a pair of brake bars, a plurality of yoke members distributed at intervals along the length of said brake bars, means for magnetically connecting each of said yoke members to both of said brake bars, a plurality of bracket members secured at intervals to each of said brake bars, bolt members mounted in each of said bracket members, a stationary frame adjacent to each of said bracket members, a movable member mounted in said frame and engaging with said bolt member and a spring member mounted on said frame and engaging with said movable member.

3. In car retarding apparatus the combination of a pair of brake bars, a plurality of yoke members distributed at intervals along the length of said brake bars, means for magnetically connecting each of said yoke members to both of said brake bars, a plurality of bracket members secured to each of said brake bars, a bolt member pivotally mounted in each of said bracket members, a stationary frame adjacent to each of said bracket members, a forked member pivotally mounted in said frame and engaging with said bolt member, a two-armed lever pivotally mounted in said frame, the upper arm of said lever engaging with said bracket member and the lower arm of said lever engaging with a spring member mounted in said frame and means for rotating said forked member about its pivot.

4. In car retarding apparatus the combination of a pair of brake bars, a plurality of yoke members secured at intervals along the length of said brake bars, means for magnetically connecting each of said yoke members to both of said brake bars, a plurality of bracket members secured to each of said brake bars, a bolt member pivotally mounted in each of said bracket members, a stationary frame adjacent to each of said bracket members, a rotatable shaft mounted in said frame in a direction at right angles to the length of said brake bars, a toothed segment secured to said shaft, a forked member pivotally mounted in said frame and engaging with said bolt member, a toothed segment secured to said forked member, a two-armed lever pivotally mounted in said frame, the upper arm of said lever engaging with said bracket member and the lower arm of said lever engaging with a spring member mounted in said frame, a shaft extending longitudinally in a direction parallel to said brake bars, and means for rotating the shaft mounted in each of said frames by means of said longtiudinal shaft.

5. In car retarding apparatus the combination of a pair of brake bars, a plurality of yoke members secured at intervals along the length of said brake bars, means for magnetically connectiong each of said yoke members to both of said brake bars, a plurality of bracket members secured to each of said brake bars, a stationary frame adjacent to each of said bracket members, a rotatable shaft mounted in said frame in a direction at right angles to the length of said brake bars, a forked member pivotally mounted in said frame and engaging with said bracket member, a shaft extending longitudinally in a direction parallel to said brake bars, means for rotating the shaft in each of said frames by means of said longitudinal shaft, a toothed segment in each frame mounted on said rotatable shaft and co-operating with toothed segments carried on each of said forked members and means for longitudinally displacing said longitudinal shaft.

6. In car retarding apparatus the combination of a pair of brake bars, a plurality of yoke members secured at intervals along the length of said brake bars, means for magnetically connecting each of said yoke members to both of said brake bars, a plurality of bracket members secured to each of said brake bars, a bolt member pivotally mounted in each of said bracket members, a stationary frame adjacent to each of said bracket members, a rotatable shaft mounted in said frame in a direction at right angles to the length of said brake bars, a forked member pivotally mounted in said frame and engaging with said bolt member, a two-armed lever pivotally mounted in said frame, the upper arm of said lever engaging with said bracket member and the lower arm of said lever engaging with a spring member mounted in said frame, a shaft extending longitudinally in a direction parallel to said brake bars, a toothed segment in each frame mounted on said rotatable shaft and cooperating with toothed segments carried on each of said forked levers, means for connecting each of said rotatable shafts to said longitudinal shaft, a motor device and means for coupling said longitudinal shaft to said motor for effecting the longitudinal displacement of said shaft.

7. In car retarding apparatus the combination of a pair of brake bars, a plurality of yoke members secured at intervals along the length of said brake bars, means for magnetically connecting each of said yoke members to both of said brake bars, a plurality of supporting members secured to each of said brake bars and distributed at spaced intervals along said bars, a stationary frame for each pair of supporting members, and a two-armed lever mounted in said frame for each of said supporting members, the one arm of each lever engaging with the adjacent supporting member and the other arm of each lever engaging with an associated spring member mounted in the adjacent frame.

8. In car retarding apparatus the combination of a pair of brake bars arranged parallel to a track rail, spring-actuated means for moving said brake bars from a higher position towards a lower position, means for limiting the downward movement of said brake bars, releasing means for rendering said limiting means inoperative, and means driven by said releasing means for positively effecting a further downward movement of said brake bars.

In testimony whereof I have hereunto set my hand.

WOLFGANG BÄSELER.